US012711504B2

(12) United States Patent
Stellini Juul Ejlersen et al.

(10) Patent No.: US 12,711,504 B2
(45) Date of Patent: Aug. 18, 2026

(54) METHOD AND SYSTEM FOR MATCHING AN ELECTRONIC SALES RECEIPT TO A USER FOR A CUSTOMER PURCHASE TRANSACTION

(71) Applicant: MYVER APS, CVR-NR 42698261, Skamby (DK)

(72) Inventors: Kristoffer Stellini Juul Ejlersen, Odense M. (DK); Frederik Stellini Juul Ejlersen, Esher (GB); Pina Stellini Ejlersen, Esher (GB); Anders Michael Juul Ejlersen, Esher (GB); Jesper Ronald Petersen, Oxshott (GB)

(73) Assignee: MYVER APS, CVR-NR 42698261, Skamby (DK)

( * ) Notice: Subject to any disclaimer, the term of this patent is extended or adjusted under 35 U.S.C. 154(b) by 157 days.

(21) Appl. No.: 18/124,124

(22) Filed: Mar. 21, 2023

(65) Prior Publication Data

US 2023/0298022 A1 Sep. 21, 2023

Related U.S. Application Data

(60) Provisional application No. 63/322,029, filed on Mar. 21, 2022.

(51) Int. Cl.

*G06Q 20/40* (2012.01)
*G06Q 20/04* (2012.01)
*G06Q 20/20* (2012.01)

(52) U.S. Cl.

CPC ....... *G06Q 20/4012* (2013.01); *G06Q 20/047* (2020.05); *G06Q 20/209* (2013.01)

(58) Field of Classification Search

CPC . G06Q 20/4012; G06Q 20/047; G06Q 20/209
See application file for complete search history.

(56) References Cited

U.S. PATENT DOCUMENTS 8,346,634 B2 1/2013 Shiftan et al.
8,671,021 B2 3/2014 Maharajh et al.
(Continued)

FOREIGN PATENT DOCUMENTS

AU 2009260642 B2 12/2009
CA 2684434 A1 1/2010
(Continued)

OTHER PUBLICATIONS

Ossama; A tokenization technique for improving the security of EMV contactless cards ; Information journal., Sep. 2022, vol. 31 (5), p. 511-526.*

(Continued)

*Primary Examiner* — Ilse I Immanuel
(74) *Attorney, Agent, or Firm* — Morse, Barnes-Brown & Pendleton PC; Sean D. Detweiler, Esq.

(57) ABSTRACT

A method and system for the matching of electronic sales receipts that protect the personal information of the user by using a Payment Account Reference (PAR) instead of payment instrument information to identify the user. The use of PAR provides several advantages. The PAR is considered non-sensitive data and cannot be misused outside the card networks—the PAR is unusable for payment as opposed to the PAN (Primary Account Number—aka. Card number). Using the PAR is a safer and faster way of identifying the transaction & user for issuing a digital receipt. The PAR remains the same, despite the card expiring, being reissued, etc.

74 Claims, 8 Drawing Sheets

(56) References Cited

U.S. PATENT DOCUMENTS

| | | | |
|---|---|---|---|
| 9,595,024 | B2 | 3/2017 | Argue et al. |
| 10,515,420 | B2 | 12/2019 | Ejlersen et al. |
| 11,010,753 | B2 | 5/2021 | Kalgi |
| 11,769,215 | B2 | 9/2023 | Ejlersen et al. |
| 12,211,107 | B2 | 1/2025 | Ejlersen et al. |
| 2002/0188561 | A1 | 12/2002 | Schultz |
| 2003/0028451 | A1 | 2/2003 | Ananian |
| 2003/0033272 | A1 | 2/2003 | Himmel et al. |
| 2003/0115135 | A1 | 6/2003 | Sarfraz et al. |
| 2003/0126020 | A1 | 7/2003 | Smith et al. |
| 2004/0117301 | A1 | 6/2004 | Fujisawa et al. |
| 2004/0225567 | A1 | 11/2004 | Mitchell et al. |
| 2009/0024536 | A1 | 1/2009 | Archer et al. |
| 2009/0271265 | A1 | 10/2009 | Lay et al. |
| 2009/0271322 | A1 | 10/2009 | Lay et al. |
| 2010/0153221 | A1 | 6/2010 | Esplin et al. |
| 2011/0034155 | A1 | 2/2011 | Kamamoto |
| 2011/0087550 | A1 | 4/2011 | Fordyce, III et al. |
| 2011/0125598 | A1 | 5/2011 | Shin et al. |
| 2011/0161230 | A1 | 6/2011 | Singh |
| 2012/0011071 | A1 | 1/2012 | Pennock et al. |
| 2012/0047052 | A1 | 2/2012 | Patel |
| 2012/0109693 | A1 | 5/2012 | Smith |
| 2012/0290422 | A1 | 11/2012 | Bhinder |
| 2012/0290484 | A1 | 11/2012 | Maher |
| 2013/0204727 | A1 | 8/2013 | Rothschild |
| 2013/0215116 | A1 | 8/2013 | Siddique et al. |
| 2014/0006198 | A1 | 1/2014 | Daly et al. |
| 2014/0040127 | A1 | 2/2014 | Chatterjee et al. |
| 2014/0195361 | A1 | 7/2014 | Murphy et al. |
| 2014/0229305 | A1 | 8/2014 | Ellan |
| 2014/0244462 | A1 | 8/2014 | Maenpaa et al. |
| 2014/0249970 | A1 | 9/2014 | Susaki et al. |
| 2015/0032638 | A1 | 1/2015 | Dintenfass et al. |
| 2015/0120418 | A1 | 4/2015 | Cervenka et al. |
| 2015/0142592 | A1 | 5/2015 | Chauhan |
| 2015/0142593 | A1 | 5/2015 | Chauhan |
| 2015/0220934 | A1 | 8/2015 | Chauhan |
| 2016/0110821 | A1 | 4/2016 | Ejlersen et al. |
| 2016/0210602 | A1 | 7/2016 | Siddique et al. |
| 2018/0053203 | A1 | 2/2018 | Pomeroy |
| 2019/0197616 | A1* | 6/2019 | Dogin ................ G06Q 20/4016 |
| 2019/0272148 | A1 | 9/2019 | Chang et al. |
| 2020/0126163 | A1 | 4/2020 | Ejlersen et al. |
| 2020/0250684 | A1* | 8/2020 | Puehse ................ G06Q 20/389 |
| 2021/0192490 | A1* | 6/2021 | Smets .................... G06Q 20/32 |
| 2023/0410216 | A1 | 12/2023 | Ejlersen et al. |
| 2025/0124521 | A1 | 4/2025 | Ejlersen et al. |

FOREIGN PATENT DOCUMENTS

| | | | | |
|---|---|---|---|---|
| CA | 2981665 | A1 * | 4/2019 | ........... G06Q 20/382 |
| CN | 104321220 | A | 1/2015 | |
| EP | 4148648 | A1 | 3/2023 | |
| GB | 2358723 | A | 8/2001 | |
| NO | 324713 | B1 | 12/2007 | |
| WO | 9922327 | A1 | 5/1999 | |
| WO | 0111539 | A1 | 2/2001 | |
| WO | 0114995 | A2 | 3/2001 | |
| WO | 2005091235 | A1 | 9/2005 | |
| WO | 2013101244 | A1 | 7/2013 | |
| WO | 2013126960 | A1 | 9/2013 | |
| WO | 2013192443 | A1 | 12/2013 | |
| WO | 2016/179543 | A1 | 11/2016 | |
| WO | 2018/209305 | A1 | 11/2018 | |
| WO | 2023/180810 | A1 | 9/2023 | |

OTHER PUBLICATIONS

Non-Final Office Action from U.S. Appl. No. 16/719,933; dated Jul. 27, 2021.

Final Office Action from U.S. Appl. No. 16/719,933; dated Dec. 29, 2021.

Non-Final Office Action from U.S. Appl. No. 16/719,933; dated Oct. 11, 2022.

Notice of Allowance from U.S. Appl. No. 16/719,933; dated May 31, 2023.

Final Office Action from U.S. Appl. No. 14/532,382; dated Nov. 16, 2017.

Final Office Action from U.S. Appl. No. 14/532,382; dated Nov. 21, 2018.

Non-Final Office Action from U.S. Appl. No. 14/532,382; dated: May 3, 2017.

Non-Final Office Action from U.S. Appl. No. 14/532,382; dated Apr. 30, 2018.

Non-Final Office Action from U.S. Appl. No. 18/239,721; dated Jun. 18, 2024.

Notice of Allowance from U.S. Appl. No. 14/532,382; dated Sep. 5, 2019.

Notice of Allowance from U.S. Appl. No. 18/239,721; dated Sep. 26, 2024.

Anonymous: "EMVCo Payment Account Reference (PAR): A Primer, Version 1.1", Secure Technology Alliance 2018 A Secure Technology Alliance Payments Council White Paper, Apr. 30, 2018 (Apr. 30, 2018), Retrieved from the Internet: URL:https://www.securetechalliance.org/wp-content/uploads/EMVCo-PAR-WP-FINAL-April-2018 [retrieved on Mar. 1, 2023].

Anonymous: "How Emerging Data Elements Can Support Mobile Wallet Use Cases", Nov. 1, 2019 (Nov. 1, 2019), Retrieved from the Internet: URL:https://www.uspaymentsforum.org/wp-con tent/uploads/2019/11/Emerging-Data-Elements-in-Mobile-Wallets-WP-FINAL-Nov-2019-.pdf [retrieved on Aug. 11, 2023].

International Search Report from International Application No. PCT/IB2023/000162; dated mailed: Aug. 22, 2023.

* cited by examiner

METHOD AND SYSTEM FOR MATCHING AN ELECTRONIC SALES RECEIPT TO A USER FOR A CUSTOMER PURCHASE TRANSACTION

CROSS-REFERENCE TO RELATED APPLICATION(S)

This application claims priority to, and the benefit of, co-pending U.S. Provisional Application 63/322,029, filed Mar. 21, 2022, for all subject matter common to both applications. The disclosure of said provisional application is hereby incorporated by reference in its entirety.

FIELD OF THE INVENTION

The present invention relates to a method and system for the matching of electronic sales receipts stemming from purchase transactions to a user.

BACKGROUND

Currently, a user, e.g., a private consumer, corporate user, firm or other, may purchase and/or pay for an item (a physical or non-physical product or service) from a point-of-sale (POS), said point-of-sale e.g., being a physical shop or an online shop or an account. The point-of-sale prints a physical receipt, and/or transmits an electronic sales receipt via email, text, or other transmission technology. Alternatively, the receipt must be downloaded from a website.

Currently, there exist very few ways of issuing digital receipts, which are riddled with friction, costly, highly inconvenient, and reliant on very sensitive cardholder data. Some of the most well-known ways of obtaining digital receipts are nothing but friction, as these require the customer to scan a QR code, and/or provide email or phone number for each receipt to be issued digitally. These are genuine Dinosaurs in the field of digital receipts.

Since the inception of QR, email and SMS-based receipts, new and smarter processes have emerged, namely technology allowing for receipts to be issued automatically based on a customer's payment card. This technology is specifically referred to as "Card linking" technology, —a technology developed for loyalty, and improperly tweaked and patched to serve the need of only issuing digital receipts.

With "card linking", as part of this purchase transaction, the user typically provides a payment instrument, such as a PAN card, digital wallet, or payment device to actuate payment. Here PAN card refers to a payment instrument such as credit card or debit card that makes use of a Primary Account Number (PAN) to identify account information. This PAN is part of the information collected and used to process the transactions and in many instances is part of the information (along with the name on the card) used to identify and track the transaction.

The card linking technology might be smart in a loyalty context, as it allows for payment cards to be linked to customers, hence allowing for identifying qualified transactions of a customer. However, the technology was built for loyalty, which makes it very costly in a digital receipt only context. Current card linking processes rely on multistep and very expensive middleware—riddled with loyalty technology for issuing digital receipts—has a lot of inherent shortcomings. The Card Linking technology being solely reliant on PAN as the primary identifier comes with great risks and problems.

However, there is an increasing demand in the industry for protecting the data of a user. Similarly, there is also a growing privacy concern from consumers, with regard to the sharing of personal and/or sensitive information. For example, in many instances, the merchant may not identify or only partially identify the PAN used in the transaction in the generated receipt data.

The PAN number is a highly sensitive payment initiator, meaning that it first needs to be securely encrypted to PCI DSS standard, and it's only to be transmitted, processed, and stored in and between PCI DSS Certified environments. This is highly problematic, as the closer the system/method gets to the merchant, the further the system/method gets away from PCI DSS Certified environments (as very few at the merchant level are PCI DSS Certified). Consequently, this results in unnecessarily added steps and costs in the process of issuing a digital receipt, which overcomplicates the process. The closer a method/process gets to the merchant level, the simpler and closer-to-real-time for issuing digital receipts—i.e., Added steps from Card-linking methods (which involves PAN)—and other similar current methods—equates to longer processing times, more required computing power, increased risks, and significantly higher costs to all parties involved.

The high sensitivity of PAN also means that PAN may or may not be renewed when a card is auto-renewed on a recurrent basis. However, PAN will always be renewed when the card is replaced. This poses a challenge for Card Linking infrastructures, as they need to capture the new PAN input from customers to continuously be able to identify and send receipts to the customer.

The digital payment wallet (such as Apple Pay™ and Google Pay™) has also been well received as a favorable payment option, due to ease of use and reduced friction. However, this shift in means of payment has posed a significant challenge for current Card Linking receipt infrastructures, which are finding it difficult to adapt to fully cater to this shift. The reason is that these digital payment wallets mask the PAN with a Device Account Number—the combination of a given payment card and a given device (smartwatch, smartphone, tablet, computer, and other payment-capable smart devices) is given a unique Device Account Number. Using this number instead of PAN forms part of digital payment wallets' built-in security measures that help to protect cardholder data during payment transactions. Thus, Card Linking infrastructures are finding it very difficult to cope, as PAN is the unique identifier, and when it is no longer readily available, it becomes increasingly difficult to identify a customer and issue a receipt to a customer. Card Linking infrastructures haven't been able to overcome this challenge successfully.

Another mechanism for protecting user data is Payment Account Reference (PAR) numbers. PAR was introduced by EMVCo to address merchant and acquirer challenges resulting from the decreasing use of PAN such as through tokenization (including PAN masking in digital wallets). PAR enables merchants and acquirers to monitor and maintain fraud, loyalty, and reporting programs dependent on PAN today. The Payment Account Reference (PAR) is a value linked to the Primary Account Number (PAN). PAR can link tokenized and PAN-based transactions without the need for a PAN as the linkage mechanism (1:1 PAR to PAN). While PAN is a sensitive transaction parameter, PAR is not sensitive data nor Payment Card Industry (PCI) account data. Thus, PAR can be used in place of PAN to identify the user and thus enable merchants, payment processors, acquirers, BIN controller issuers, card schemes, POS systems, payment gateways, and service providers to uniquely identify a cardholder account without continued exposure and storage of the PAN. Similarly, PAR can be used in place of PAN for inquiries to the card scheme and issuer. It should be understood that PAR is for uniquely referencing a PAN only and cannot be used to replace the PAN in payment transaction processing. Thus, if cardholder data stored at the payment processor, acquirers, merchant, and/or service providers is breached and/or stolen, the stored PAR number cannot be used to commit fraud.

Every time a PAN number is transmitted, processed, or stored, it carries a significant amount of risk, and the risk is even greater when PAN data is moved from one system/stakeholder to another. The more steps and system integrations, the greater the exposure to the risk of a breach/exposure of PAN data. A further problem with the current Card Linking infrastructure for issuing digital receipts is that the customer's PAN number and associated qualified transaction are identified after the Authorization of payment (Clearing phase of transactions), which depends on when the payment processor/acquirer allows for the card schemes to identify the qualified transaction, and hence customer. This process might happen instantaneously, and in some instances, it might take longer (up to 1-3 days), depending on the purchase country, payment processor/acquirer, and if it is a cross-border transaction.

SUMMARY

The present invention is directed toward further solutions to address the aforementioned needs, in addition to having other desirable characteristics. The present invention extends the personal identification protection functionality of PAR by enabling it to be used to identify a user for the purposes of identifying a transaction and issuing an electronic sales receipt in an unconventional manner. Specifically, the system and method for issuing electronic sales receipts of the present invention use PAR instead of PAN (or any other potentially sensitive information) or other types of Card linking technology for identifying the user as well as the transactions performed resulting in the issuance of an electronic sales receipt to the user. The use of PAR provides several advantages. The PAR number is considered non-sensitive data and not subject to PCI requirements for protecting account data and cannot be misused outside the card networks—the PAR number is unusable for payment as opposed to the PAN (Primary Account Number—aka. Card number). Using the PAR is a safer and faster way of identifying the transaction & user for issuing a digital receipt. The PAR number can remain the same, despite the card expiring, being reissued, etc. PAR doesn't have any other function than being able to identify a customer and/or link a PAN-represented payment account to affiliated payment tokens. Thus, PAR can in the ideal world be stored in non-PCI Certified environments, such as the merchant's local POS system. Hence, using PAR to issue digital receipts will allow for several steps in the Card Linking infrastructure to be eliminated, and hence speed up the process of issuing digital receipts closer to real-time. However, PAR lifecycle is determined by Bank Identifier Number (BIN) controller.

At a very high level, issuing a receipt requires two things 1) being able to identify a customer from a transaction and 2) being able to fetch and pair SKU line-item data with a customer's account based on the transaction information. This is highly problematic for Card Linking infrastructures, as POS systems possess SKU line-item level data but NOT PAN (due to POS systems not being able to store PAN, as it would require POS systems to be PCI DSS certified) and Card Linking infrastructures possess PAN but not SKU line-item level data. Hence, when Card Linking infrastructures issue receipts to customers, the process utilizes a significant degree of guess-based-estimation, i.e., pairing the SKU line-item data with PAN data—they match provided data from both systems based on parameters such as merchant ID, date and time stamp, transaction amount, merchant code, authorization code, last 4 PAN digits, Terminal ID, currency code, etc. Thus, the transaction and SKU line-item data is not uniquely matched but is rather matched based on the method of exclusion, as all required systems aren't able to store or process PAN. Ultimately, this exposes Card Linking infrastructures to a myriad of process failures; the match may NOT be unique, or time may not be synced correctly between different infrastructural components. With PAR on the other hand, matching is unique, as that PAR data from the transaction can 1-to-1 be matched with the PAR data from the merchants' POS systems, as storage and processing of PAR data don't require PCI DSS Compliance.

In summary from a security/risk and processing perspective, the PAR infrastructure is far superior to current Card Linking infrastructure, as fewer steps overall, fewer (if any) sensitive PAN processing steps, and fewer parameters needed to be analyzed, means far less required computing processing power, and consequently faster receipt response delivery times (closer to real-time), more accurate and safer/secure identification, fewer errors, lesser risks (breaches and exposure of sensitive PAN data). Traditional Card Linking infrastructures will not on any level be able to compete with an equivalent PAR infrastructure.

There are three main data streams needed in order to be able to issue a digital sales receipt with line items based on PAR: 1) obtaining the PAR (facilitating identification of the user), 2) the payment or transaction data (notifying the system that one of the users has used their card), and 3) Line item sales receipt data (allowing for the extraction of receipt data and issuance to user in a digital format). Each of these data streams can operate in various ways and involve one or more actors.

1) Obtaining PAR:
   a) PAR can be obtained directly through the card scheme (Visa, MasterCard, Amex, etc.), via an API call that can tap into and request the PAN to PAR swap for any given card within any given card scheme.
   b) PAR can be obtained directly through the issuer (Citigroup, US Bank, JPMorgan, Amazon, Apple, etc.), via an API call that can tap into and request the PAN to PAR swap for any given card for any given customer of the issuer (here it is limited to only the issuer's customers).
   c) PAR can be obtained directly from the User's payment device (smart watch, smart phone, tablet, computer, and other payment capable smart devices), as the payment device can contain the PAR readable with a payment device reader (such as payment terminal/payment device reader)
   d) PAR can be obtained through the BIN controller, The BIN controller can issue the PAR, for example via an API call that can tap into and request the PAN to PAR swap.
   e) PAR can be obtained through a combination of above via the merchant where, when a user completes a purchase, the merchant can offer to sign up the user to receive digital receipts. PAR can be directly obtained from completed purchase or PAN/Token from purchase can be used to fetch PAR and enroll user via the merchant.

f) A combination of the above.

2) The Payment or Transaction data:

a) The sales receipt system can get the transaction data directly from the issuer or BIN controller; hence, the issuer or BIN Controller will provide notice when a transaction has been authorized/confirmed/cleared/settled for a user of the system.

b) The sales receipt system can get the transaction data directly from the card scheme; hence, the card scheme will provide notice when a transaction has been authorized/confirmed/cleared/settled for a user of the system.

c) The sales receipt system can get the transaction data directly from the acquirer or payment processor; hence, the acquirer or payment processor will provide notice when a transaction has been authorized/confirmed/cleared/settled for a user of the system.

d) The sales receipt system can get the transaction data directly from the merchant (including POS system, payment terminal/payment device reader, or payment gateway); hence, the merchant will provide notice when a transaction has been authorized/confirmed/cleared/settled for a user of the system.

e) A combination of the above.

3) Sales Receipt data:

a) The sales receipt system can get the receipt data from the issuer (BIN Controller)—here the issuer has a direct/indirect integration with the POS and/or merchant system, where it is the issuer that extracts or receives the data and pulls it into their system. The sales receipt system can take advantage of this integration between the POS (and/or merchant) and issuer, resulting in the sales receipt system being able to get receipt data directly from the issuer.

b) The sales receipt system can get the receipt data from the card scheme—here the card scheme has a direct/indirect integration with the POS and/or merchant system, where it is the card scheme that extracts or receives the data and pulls it into their system. The sales receipt system can take advantage of this integration between the POS (and/or merchant) and card scheme, resulting in the sales receipt system being able to get receipt data directly from the card scheme.

c) The sales receipt system can get the receipt data from the acquirer and/or payment processor—here the acquirer and/or payment processor has a direct/indirect integration with the POS and/or merchant system, where it is the acquirer and/or payment processor which extracts or receives the data and pulls it into their system. The sales receipt system can just take advantage of this integration between the POS (and/or merchant) and acquirer and/or payment processor, resulting in the sales receipt system can being able to get receipt data directly from the acquirer and/or payment processor.

d) The sales receipt system can get receipt data from the merchant (or POS system or payment gateway)—here the sales receipt system can have its own direct integration with the merchant system, hence allowing the sales receipt system to directly extract or receive receipt data from the merchant system.

e) A combination of the above.

It is the matching of transaction or payment data (point 2) with receipt data (point 3), that is challenging, as very few merchant systems cater to the use of PAR. Hence, for this linking of data, the sales receipt system should not rely solely on PAR, but broaden the scope to not only PAR, but also other payment/transaction parameters such as transaction ID, amount, date, time, etc. which can be used to identify transactions. In an ideal world, PAR would be the only unique identifier in both systems (points 2 & 3), but to account for how the world actually operates, one needs to factor in other payment/transaction parameters.

Moreover, in an ideal world as PAR becomes more widespread and accepted, and with PAR being non-PCI account data and its inability to be misused for authorization or initiating a financial transaction, PAR could in the future be stored locally on all POS devices which would further lower processing times and costs.

In accordance with embodiments of the present invention, a method of matching an electronic sales receipt to a user for a customer purchase transaction is provided. The method includes a merchant computing system receiving payment data via a payment instrument having payment instrument information provided to complete payment for the customer purchase transaction; the merchant computing system communicating payment instrument information to a payment processor computing system; the payment processor computing system processing payment, storing the payment data for the purchase transaction in a datastore including reference to a customer Payment Account Reference (PAR) number, and confirming processing of the payment with the merchant computing system; the merchant computing system completing the purchase transaction and storing sales receipt data in a merchant datastore; a sales receipt computing system on which the customer PAR associated with the user is stored receiving the payment data wherein the customer is identified by the customer PAR; the sales receipt computing system receiving the sales receipt data generated by the merchant computing system; and the sales receipt computing system matching the payment data and the sales receipt data with the user using the customer PAR and without requiring the payment instrument or payment instrument information. The matching enables the issuance of an electronic sales receipt to the user.

In accordance with aspects of the present invention, the payment instrument comprises one of: a Primary Account Number (PAN) and a token corresponding to the PAN or PAN derivatives.

In accordance with aspects of the present invention, the customer PAR is provided with the payment instrument. In other aspects, the customer PAR is provided to the payment processor computing system as part of payment processing. In some such aspects, the customer PAR is provided to the payment processor computer system by an acquirer, card scheme, or issuer computing system.

In accordance with aspects of the present invention, the method further includes the sales receipt computing system receiving a primary account number (PAN), sending the PAN to an issuer or card scheme to request the PAR corresponding to the PAN, receiving the customer PAR in response to the request, and storing the customer PAR.

In accordance with aspects of the present invention, processing payment comprises providing payment instrument information to and receiving payment data for the purchase transaction in response from one or more of: an acquirer, a card scheme, and an issuer.

In accordance with aspects of the present invention, the payment processing confirmation comprises a payment authorization message sent to the sales receipt computing system.

In accordance with aspects of the present invention, payment data received by the sales receipt computing system is provided by the payment processing computing system. In some such aspects, the payment processing computing system provides the sales receipt computing system the payment data when payment processing is confirmed. In some such aspects, receiving the payment data comprises the sales receipt computing system requesting payment data from the payment processing computing system using the customer PAR, and receiving, in response to the request, the payment data stored in the payment processor datastore including reference to the customer PAR. In still further aspects, receiving the payment data from the payment processor computing system further comprises the payment processing computing system receiving the request for payment data from the sales receipt computing system, identifying the payment data stored in the payment processor datastore including reference to the customer PAR, and providing the sales receipt computing system with the identified payment data stored in the payment processor datastore including reference to the customer PAR.

In accordance with aspects of the present invention, payment data received by the sales receipt computing system is provided by an acquirer computing system involved in the processing of the payment. In some such aspects, the acquirer computing system provides the sales receipt computing system the payment data when payment processing is confirmed. In other aspects, receiving the payment data comprises the sales receipt computing system requesting payment data from the acquirer computing system using the customer PAR and receiving, in response to the request, the payment data stored in an acquirer datastore including reference to the customer PAR. In some such aspects, receiving the payment data from the acquirer computing system further comprises the acquirer computing system receiving the request for payment data from the sales receipt computing system, identifying the payment data stored in the acquirer datastore including reference to the customer PAR, and providing the sales receipt computing system with the identified payment data stored in the acquirer datastore including reference to the customer PAR.

In accordance with aspects of the present invention, payment data received by the sales receipt computing system is provided by a card scheme computing system involved in the processing of the payment. In some such aspects, the card scheme computing system provides the sales receipt computing system the payment data when payment processing is confirmed. In other aspects, receiving the payment data comprises the sales receipt computing system requesting payment data from the card scheme computing system using the customer PAR and receiving, in response to the request, the payment data stored in a card scheme datastore including reference to the customer PAR. In some such aspects, receiving the payment data from the card scheme computing system further comprises the card scheme computing system receiving the request for payment data from the sales receipt computing system, identifying the payment data stored in the card scheme datastore including reference to the customer PAR, and providing the sales receipt computing system with the identified payment data stored in the card scheme datastore including reference to the customer PAR.

In accordance with aspects of the present invention, payment data received by the sales receipt computing system is provided by an issuer computing system involved in the processing of the payment. In some such aspects, the issuer computing system provides the sales receipt computing system the payment data when payment processing is confirmed. In other aspects, receiving the payment data comprises the sales receipt computing system requesting payment data from the issuer computing system using the customer PAR and receiving, in response to the request, the payment data stored in an issuer datastore including reference to the customer PAR. In some such aspects, receiving the payment data from the issuer computing system further comprises the issuer computing system receiving the request for payment data from the sales receipt computing system, identifying the payment data stored in the issuer datastore including reference to the customer PAR, and providing the sales receipt computing system with the identified payment data stored in an issuer datastore including reference to the customer PAR.

In accordance with aspects of the present invention, payment data received by the sales receipt computing system is provided by the merchant computing system. In some such aspects, the merchant computing system provides the sales receipt computing system the payment data when the purchase transaction is complete. In other aspects, receiving the payment data comprises the sales receipt computing system requesting payment data from the merchant computing system using the customer PAR and receiving, in response to the request, the payment data stored in the merchant datastore including reference to the customer PAR. In some such aspects, receiving the payment data from the merchant computing system further comprises the merchant computing system receiving the request for payment data from the sales receipt computing system, identifying the payment data stored in the merchant datastore including reference to the customer PAR, and providing the sales receipt computing system with the identified payment data stored in a POS and/or merchant datastore including reference to the customer PAR.

In accordance with aspects of the present invention, the sales receipt data received by the sales receipt computing system is provided by the merchant computing system. In some such aspects, the merchant computing system provides the sales receipt computing system the sales receipt data when the purchase transaction is complete. In other aspects, receiving the sales receipt data from the merchant computing system comprises the sales receipt computing system extracting transaction parameters from the payment data received; requesting the sales receipt data from the merchant computing system using the extracted transaction parameters; and receiving, in response to the request, the sales receipt data stored in the merchant datastore. In some such aspects, the transaction parameters comprise one or more of: merchant/POS of transaction, transaction ID, merchant/POS ID, merchant code, authorization code, last 4 PAN digits, First 6 PAN digits, PAR, PAN Token/derivative, Terminal ID, currency code, amount of transaction, date of transaction, and time of transaction. In still further aspects, receiving the sales receipt data from the merchant computing system further comprises the merchant computing system receiving the request for the sales receipt data from the sales receipt computing system; identifying the sales receipt data stored in the merchant datastore including the transaction data; and providing the sales receipt computing system with the identified sales receipt data stored in the merchant datastore. In yet further aspects, the sales receipt data stored in the data store includes the customer PAR. In some such aspects, receiving the sales receipt data from the merchant computing system comprises the sales receipt computing system requesting the sales receipt data from the merchant computing system using the customer PAR and receiving, in response to the request, the sales receipt data stored in the merchant datastore including reference to the customer PAR. In some such further aspects, receiving the sales receipt data from the merchant computing system further comprises the merchant computing system receiving the request for the sales receipt data from the sales receipt computing system; identifying the sales receipt data stored in the merchant datastore including reference to the customer PAR; and providing the sales receipt computing system with the identified sales receipt data stored in the POS datastore including reference to the customer PAR.

In accordance with aspects of the present invention, the sales receipt data received by the sales receipt computing system is provided by the payment processing computing system. In some such aspects, the payment processing computing system provides the sales receipt computing system with the sales receipt data when the purchase transaction is complete. In other aspects, receiving the sales receipt data from the payment processing computing system comprises the sales receipt computing system extracting transaction parameters from the payment data received; requesting the sales receipt data from the payment processing computing system using the extracted transaction parameters; and receiving, in response to the request, the sales receipt data stored in the payment processor datastore. In some such aspects, the transaction parameters comprise one or more of: merchant/POS of transaction, transaction ID, merchant/POS ID, merchant code, authorization code, last 4 PAN digits, First 6 PAN digits, PAR, PAN Token/derivative, Terminal ID, currency code, amount of transaction, date of transaction, and time of transaction. In still further aspects, receiving the sales receipt data from the payment processing computing system further comprises the payment processing computing system receiving the request for the sales receipt data from the sales receipt computing system; identifying the sales receipt data stored in the payment processing datastore including the transaction data; and providing the sales receipt computing system with the identified sales receipt data stored in the payment processing datastore. In yet further aspects, the sales receipt data stored in the data store includes the customer PAR. In some such aspects, receiving the sales receipt data from the payment processing computing system comprises the sales receipt computing system requesting the sales receipt data from the payment processing computing system using the customer PAR; and receiving, in response to the request, the sales receipt data stored in the payment processing datastore including reference to the customer PAR. In some such further aspects, receiving the sales receipt data from the payment processing computing system further comprises the payment processing computing system receiving the request for the sales receipt data from the sales receipt computing system; identifying the sales receipt data stored in the payment processing datastore including reference to the customer PAR; and providing the sales receipt computing system with the identified sales receipt data stored in the payment processing datastore including reference to the customer PAR.

In accordance with aspects of the present invention, the sales receipt data received by the sales receipt computing system is provided by an acquirer computing system involved in the processing of payment. In some such aspects, the acquirer computing system provides the sales receipt computing system with the sales receipt data when the purchase transaction is complete. In other aspects, receiving the sales receipt data from the acquirer computing system comprises the sales receipt computing system extracting transaction parameters from the payment data received; requesting the sales receipt data from the acquirer computing system using the extracted transaction parameters; and receiving, in response to the request, the sales receipt data stored in an acquirer datastore. In some such aspects, the transaction parameters comprise one or more of: merchant/POS of transaction, transaction ID, merchant/POS ID, merchant code, authorization code, last 4 PAN digits, First 6 PAN digits, PAR, PAN Token/derivative, Terminal ID, currency code, amount of transaction, date of transaction, and time of transaction. In other aspects, receiving the sales receipt data from the acquirer computing system further comprises the acquirer computing system receiving a request for the sales receipt data from the sales receipt computing system; identifying the sales receipt data stored in an acquirer datastore including the transaction data; and providing the sales receipt computing system with the identified sales receipt data stored in an acquirer datastore. In still other aspects, the sales receipt data stored at the acquirer includes the customer PAR. In some such aspects, the sales receipt data from the acquirer computing system comprises the sales receipt computing system requesting the sales receipt data from the acquirer computing system using the customer PAR; and receiving, in response to the request, the sales receipt data stored in an acquirer datastore including reference to the customer PAR. Further in some such aspects, receiving the sales receipt data from the acquirer computing system further comprises the acquirer computing system receiving a request for the sales receipt data from the sales receipt computing system; identifying the sales receipt data stored in an acquirer datastore including reference to the customer PAR; and providing the sales receipt computing system with the identified sales receipt data stored in an acquirer datastore including reference to the customer PAR.

In accordance with aspects of the present invention, the sales receipt data received by the sales receipt computing system is provided by a card scheme computing system involved in the processing of payment. In some such aspects, the card scheme computing system provides the sales receipt computing system with the sales receipt data when the purchase transaction is complete. In other aspects, receiving the sales receipt data from the card scheme computing system comprises the sales receipt computing system extracting transaction parameters from the payment data received; requesting the sales receipt data from the card scheme computing system using the extracted transaction parameters; and receiving, in response to the request, the sales receipt data stored in a card scheme datastore. In still further aspects, the transaction parameters comprise one or more of: merchant/POS of transaction, transaction ID, merchant/POS ID, merchant code, authorization code, last 4 PAN digits, First 6 PAN digits, PAR, PAN Token/derivative, Terminal ID, currency code, amount of transaction, date of transaction, and time of transaction. In some further aspects, receiving the sales receipt data from the card scheme computing system further comprises the card scheme computing system receiving a request for the sales receipt data from the sales receipt computing system; identifying the sales receipt data stored in a card scheme datastore including the transaction data; and providing the sales receipt computing system with the identified sales receipt data stored in the card scheme datastore. In some such further aspects, the sales receipt data stored in the card scheme includes the customer PAR. Still further in some such aspects, receiving the sales receipt data from the card scheme computing system comprises the sales receipt computing system: requesting the sales receipt data from the card scheme computing system using the customer PAR and receiving, in response to the request, the sales receipt data stored in a card scheme datastore including reference to the customer PAR. In some such aspects, receiving the sales receipt data from the card scheme computing system further comprises the card scheme computing system receiving a request for the sales receipt data from the sales receipt computing system identifying the sales receipt data stored in a card scheme datastore including reference to the customer PAR and providing the sales receipt computing system with the identified sales receipt data stored in the card scheme datastore including reference to the customer PAR.

In accordance with aspects of the present invention, the sales receipt data received by the sales receipt computing system is provided by an issuer computing system involved in the processing of payment. In some such aspects, the issuer computing system provides the sales receipt computing system with the sales receipt data when the purchase transaction is complete. In other aspects, receiving the sales receipt data from the issuer computing system comprises the sales receipt computing system extracting transaction parameters from the payment data received; requesting the sales receipt data from the issuer computing system using the extracted transaction parameters; and receiving, in response to the request, the sales receipt data stored in an issuer datastore. In some such aspects, the transaction parameters comprise one or more of: merchant/POS of transaction, transaction ID, merchant/POS ID, merchant code, authorization code, last 4 PAN digits, First 6 PAN digits, PAR, PAN Token/derivative, Terminal ID, currency code, amount of transaction, date of transaction, and time of transaction. In other such aspects, receiving the sales receipt data from the issuer computing system further comprises the issuer computing system receiving a request for the sales receipt data from the sales receipt computing system; identifying the sales receipt data stored in an issuer datastore including the transaction data; and providing the sales receipt computing system with the identified sales receipt data stored in the issuer datastore. In yet other aspects, the sales receipt data stored at the issuer includes the customer PAR. In some such other aspects, receiving the sales receipt data from the issuer computing system comprises the sales receipt computing system requesting the sales receipt data from the issuer computing system using the customer PAR and receiving, in response to the request, the sales receipt data stored in an issuer datastore including reference to the customer PAR. Still further in some such aspects, receiving the sales receipt data from the issuer computing system further comprises the issuer computing system receiving a request for the sales receipt data from the sales receipt computing system; identifying the sales receipt data stored in an issuer datastore including reference to the customer PAR; and providing the sales receipt computing system with the identified sales receipt data stored in the issuer datastore including reference to the customer PAR.

In accordance with aspects of the present invention, further comprising storing one or more of the payment data, receipt data, and the electronic sales receipt wherein the user is identified by the PAR in a datastore of the sales receipt computing system.

In accordance with aspects of the present invention, the merchant computing system comprises a Point of Sale (POS) system. In other aspects, the merchant computing system comprises a payment gateway. In still other aspects, the merchant computing system comprises a payment terminal or payment device reader.

In accordance with aspects of the present invention, the method includes the sales receipt computing system issuing an electronic sales receipt to the user. In other aspects, the method further includes providing the payment data and sales receipt data matched/linked with the user to one or more of: merchant, payment processor, acquirer, card scheme, and issuer so that an electronic sales receipt can be issued to the user.

In accordance with aspects of the present invention, the sales receipt computing system receives the PAR from one or more of: user, merchant, payment processor, acquirer, card scheme, and issuer.

In accordance with embodiments of the present invention, a system for matching an electronic sales receipt to a user for a customer purchase transaction is provided, The system includes a merchant computing system, a payment processor, and a sales receipt computing system. The merchant computing system comprises a processor and a datastore and is configured to receive payment data via a payment instrument having payment instrument information provided to complete payment for the customer purchase transaction; communicate payment instrument information to a payment processor computing system; receive confirmation of payment processing; complete the purchase transaction; and store sales receipt data in the datastore. The payment processor computing system comprises a processor and a datastore and is configured to receive payment instrument information from the merchant computing system; process payment; store payment data for the purchase transaction in the datastore including reference to a customer; and confirm processing of the payment with the merchant computing system. The sales receipt computing system comprises a processor and datastore and is configured to store the customer Payment Account Reference (PAR) associated with the user in the datastore; receive the payment data; store the received payment data in the datastore; receive the sales receipt data generated by the merchant computing system; store the received sales receipt data in the datastore; and match the payment data and the sales receipt data with the user using the PAR, wherein the match enables issuance of an electronic sales receipt to the user.

In accordance with embodiments of the present invention, a method of issuing an electronic sales receipt to a user for a customer purchase transaction is provided. The method involves a merchant computing system receiving payment data via a payment instrument having payment instrument information provided to complete payment for the customer purchase transaction; the merchant computing system communicating payment instrument information to a payment processor computing system; the payment processor computing system processing payment, storing the payment data for the purchase transaction in a payment processor datastore, and confirming processing of the payment with the merchant computing system; the merchant computing system completing the purchase transaction; and storing sales receipt data in a merchant datastore; receiving the payment data; matching the payment data and the sales receipt data with the user using the Payment Account Reference (PAR); and issuing an electronic sales receipt to a sales receipt computing system which stores the electronic sales receipt in a datastore; and the sales receipt computing system providing user access to the electronic sales receipt.

In accordance with embodiments of the present invention, a system for issuing an electronic sales receipt to a user for a customer purchase transaction is provided, the system includes a merchant computing system, a payment processing system, and a sales receipt computing system. The merchant computing system comprises a processor and a datastore and is configured to: receive payment data via a payment instrument having payment instrument information provided to complete payment for the customer purchase transaction; communicate payment instrument information to a payment processor computing system; receive confirmation of payment processing; complete the purchase transaction; store sales receipt data in the datastore; receive payment data; store payment data in the datastore; match payment data to sales receipt data; and issue an electronic sales receipt to the user using the customer Payment Account Reference (PAR) instead of the payment instrument or payment instrument information. The payment processor computing system comprises a processor and a datastore and is configured to: receive payment instrument information from the merchant computing system; process payment; store payment data for the purchase transaction in the datastore; and confirm processing of the payment with the merchant computing system. The sales receipt computing system comprises a processor and datastore and is configured to: receive the electronic sales receipt issued from the merchant; store the electronic sales receipt in a datastore; and provide user access to the electronic sales receipt using the customer PAR.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
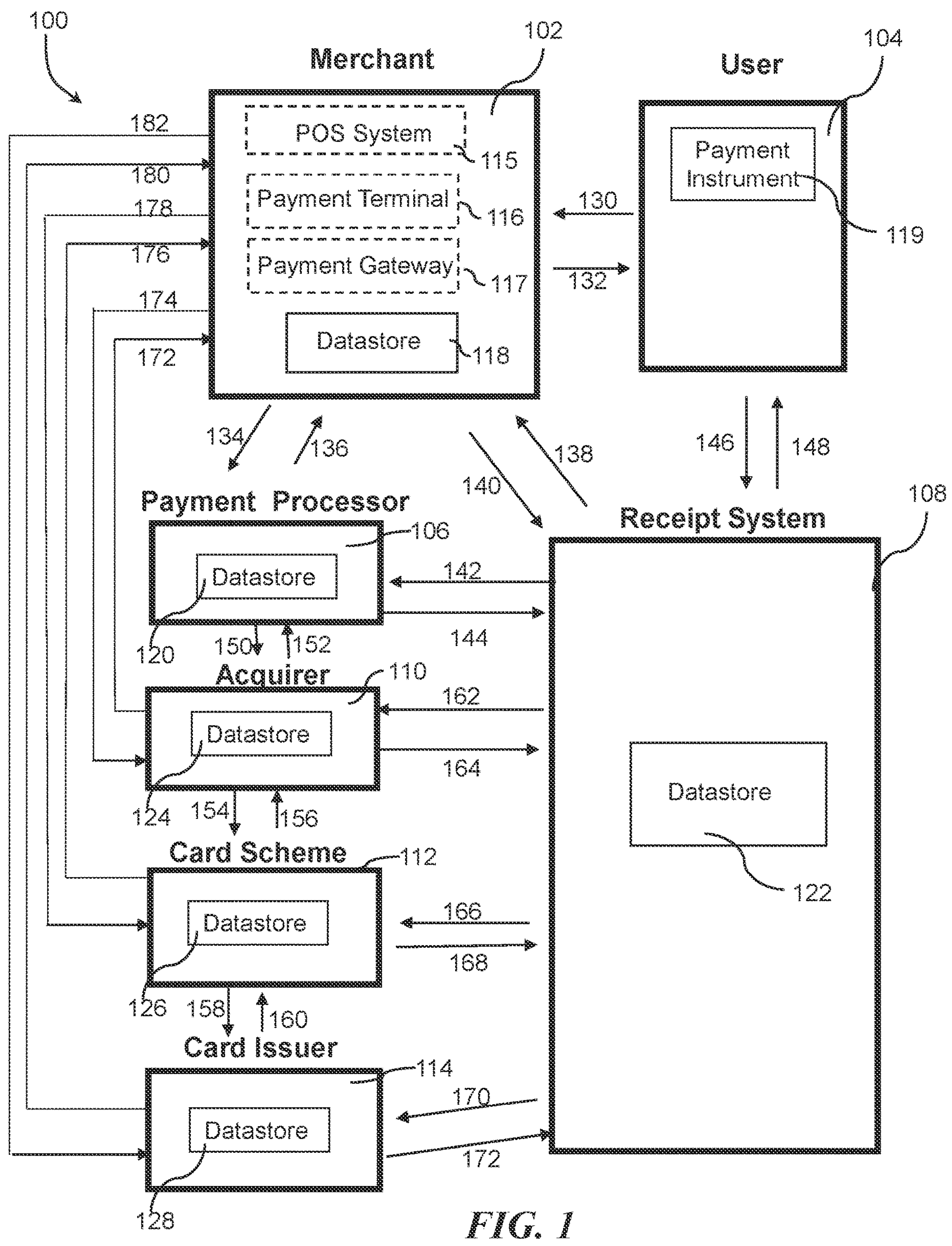
FIG. 1 is an example system for monitoring a purchase transaction at a point of sale and issuing an electronic sales receipt to a user based on the transaction in accordance with embodiments of the present invention.

An illustrative embodiment of the present invention relates to a method and system for the issuing of electronic sales receipts that protect the personal information of the user by using a Payment Account Reference (PAR) number instead of payment instrument information to identify the user. The use of PAR provides several advantages. The PAR number is considered non-sensitive data and non-PCI DSS account data and cannot be misused outside the card networks—the PAR number is unusable for payment as opposed to the PAN (Primary Account Number—aka. Card number). Using the PAR is a safer, faster, and frictionless way of identifying the transaction & user for issuing a digital sales receipt. The PAR number will in most cases remain the same, despite the card expiring, being reissued, etc.

FIG. 1 through FIG. 8 wherein like parts are designated by like reference numerals throughout, illustrate an example embodiment or embodiments of method and system for the issuing of electronic sales receipts, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

A system 100 for processing and tracking a customer purchase transaction and issuing an electronic sales receipt is depicted in FIG. 1.

The system 100 includes a merchant 102, a user 104, a payment processor 106, and a sales receipt system 108. In certain embodiments, the system 100 may also include one or more of an acquirer 110, a card scheme 112, and a card issuer (or BIN controller) 114. Each of these components is in communication with other components of the system 100. For example, the components 102, 104, 106, 108, 110, 112, and 114 can be in electronic communication such as over a network. It should also be understood that one or more of the components 102, 104, 106, 108, 110, 112, and 114, (or parts or all of the functionality provided by them) can be combined with or otherwise found in other components 102, 104, 106, 108, 110, 112, and 114.

The merchant 102 is a place where a customer executes the payment for goods or services such as merchant or vendor. It can comprise a Point of Sale (POS) system 115, payment terminal/payment device reader 116, and/or a payment gateway 117 comprising software, hardware, or a combination of both.

POS system 115 is software and/or hardware that is typically used to receive, process, and store information regarding payment for goods or services when a transaction is conducted at a merchant. A payment terminal or payment device reader 116 is the hardware used to read and accept PAN card (credit or debit) type payment instruments. A payment gateway 117 is software and/or hardware that is typically used to receive, process, and store information regarding payment for goods or services when a transaction is conducted online. A payment terminal or payment device reader 116 and/or payment gateway 117 can be part of the POS system 115 or separate. In some instances, the POS system 115, payment terminal or payment device reader 116, or payment gateway 117, including the necessary software and hardware, is provided by a separate or third-party contracted by the merchant 102. Regardless of implementation, the POS system 115, payment terminal or payment device reader 116, and/or payment gateway 117 provide the necessary functionality for a merchant to conduct the transaction using a credit card, debit card, digital wallet, or PAN card and for the purposes of this disclosure will be considered part of the functionality provided by the merchant 102.

The merchant 102 receives the payment information and records the details of the transaction as sales receipt data. It can be in a physical store or a virtual sales point such as a webshop, online store, computer, or mobile electronic device, or any combination thereof. In this example, the merchant 102 further includes a datastore 118 for storing sales receipt data for purchase transactions and, in some instances, payment or transaction data.

Sales Receipt data may include detailed and relevant information such as merchant data (name, address, ID number), receipt/order ID, date and time, barcode, till, return policy, loyalty, reward, employee details, notes, references, a description or listing of each item purchased as well as the cost for each item, category of purchased item(s), the total cost of all the items, plus a description or listing of any taxes or fees charged and discounts applied. In contrast, payment or transaction data, such as provided in PAN card (e.g. credit card or debit card) receipts, specifies only the total billable amount, without providing a detailed breakdown and description for each individual line item, discount, tax, or fee, which makes up the total billable amount. Furthermore, PAN card (credit/debit) receipts cannot by law be used for things like financial bookkeeping, tax deductions, VAT, etc. whereas sales receipts can be used for financial bookkeeping tax deductions, VAT, etc.

The user 104 is the owner or individual associated with the payment instrument 119 being used for the transaction with the merchant 102. In some instances, the user 104 may be the customer conducting the transaction with the merchant 102. In other instances, the customer conducting the transaction may be an agent of the user 104 with which the payment instrument 118 is associated. The payment instrument 119 used to conduct the transaction is a Primary Account Number (PAN) of PAN card (such as a credit card or debit card) or a token corresponding to the PAN.

The payment processor 106 is an entity appointed by the merchant 102 to handle payment instrument 119 (credit card, debit card, etc.) transactions. The payment processor 106 possesses the infrastructure and technical connections necessary to authorize transactions and move them through the entities involved in the processing of payment. It also manages the process of settling the funds—moving funds from the issuer 114 to the acquirer 110. In this example, the payment processor 106 further includes a datastore 120 for storing payment or transaction data for purchase transactions.

The sales receipt system 108 maintains an account for the user 104 and receives and/or collects payment or transaction data and receipt data associated with purchase transactions made using a payment instrument 119 associated with the user 104, and matches the payment data, and the receipt data to the user 104 using PAR for issuing to the user 104, an electronic sales receipt. The sales receipt system 108 does not have to store sensitive payment instrument information for the user 104 but instead can use a PAR to track the transactions made using payment instrument 119 of the user 104. The sales receipt system 108 may further include a datastore 122 for storing data such as: account data for the user 104 including a PAR, payment data for purchase transactions, and sales receipt data for purchase transactions.

The acquirer 110 is the financial institution that handles the funds for the merchant 102. Sometimes the acquirer 110 is the same entity as the payment processor 106. In certain embodiments, the acquirer 110 may further include datastore 124 for storing payment data for purchase transactions and, in some instances, sales receipt data for purchase transactions.

The card scheme 112 is the payment network linked to payment cards, such as debit, credit, or other PAN cards, of which a bank or any other eligible financial institution can become a member. Examples of such card schemes include Visa™, Mastercard™ American Express™, Dankort™, UnionPay™, and Discover™. In certain embodiments, the card scheme 112 may further include a datastore 126 for storing payment data for purchase transactions and, in some instances, sales receipt data for purchase transactions.

The issuer 114 is the financial institution that represents the user 104 in the financial transaction and issues the payment instrument 119 to the user 104 for use in transactions. In some instances, the issuer 114 may also comprise a BIN controller. In certain embodiments, the issuer 114 may further include datastore 128 for storing payment data for purchase transactions and, in in some instances, sales receipt data for purchase transactions.

Figure 2:
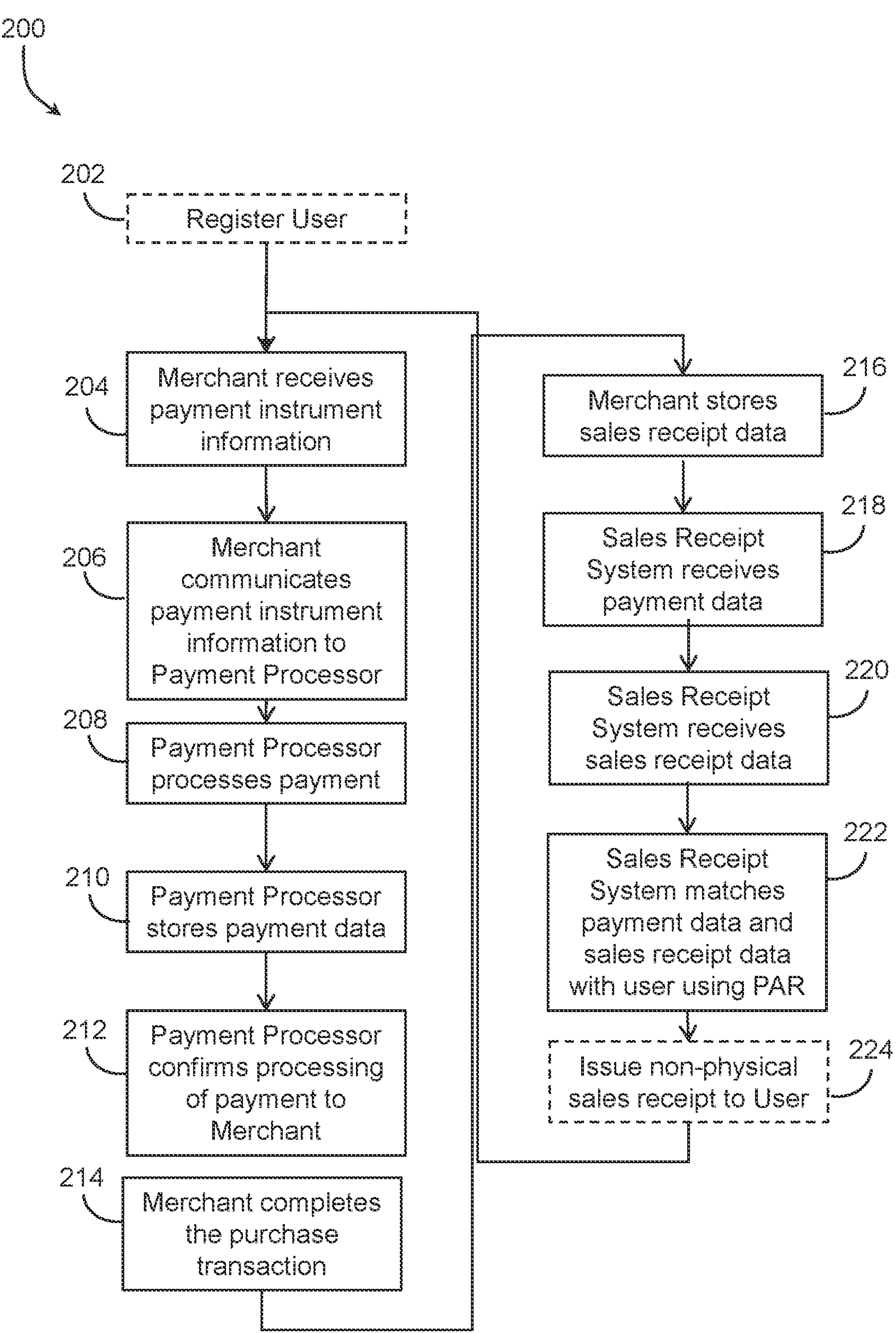
FIG. 2 a flow diagram depicting an example methodology for issuing an electronic sales receipt to user for a customer purchase transaction.

The operation of the system 100 is set forth in the method 200 of the flowchart of FIG. 2. Before any electronic sales receipts can be issued, a user 104 needs to be registered with the sales receipt system 108 (Step 202). This involves an interaction, in this case an electronic communication, between the user 104 and sales receipt system 108 as indicated by arrows 146 and 148 of FIG. 1. This registration 202 includes providing information about the user 104 typically required for setting up an account including, name, contact information PAN number or PAN token/equivalent (to be used for a PAN to PAR swap described herein), etc. In certain embodiments, this is performed via the sales receipt system's own web interface or the sales receipt system's own application on the computing device of the user 104, or directly via the merchant's own system(s), via a service provider/partner/customer (such as banks, issuers, expense management systems, or other receipt providers) of the sales receipt system, or a combination thereof. As part of this process, the PAR for the user 104 is stored on the sales receipt system 108 as part of the user account. The PAR can be provided by the user 104, payment instrument 119, or the merchant 102 or obtained by performing a PAN to PAR swap. Further discussion of acquiring the PAR is provided in relation to FIG. 3 herein.

Figure 3:
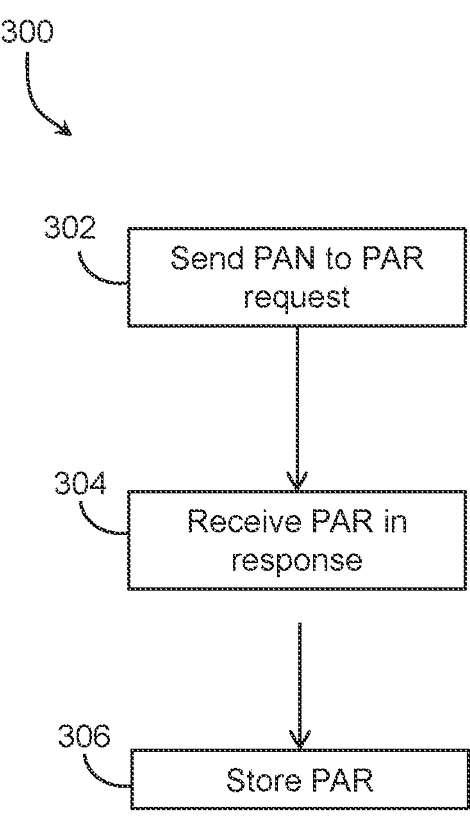
FIG. 3 is a flow diagram depicting an example methodology performing a PAN to PAR swap.

FIG. 3 depicts an example methodology 300 for performing a PAN for PAR swap. The PAN or PAN token or PAN equivalent or PAN derivative of the credit card, debit card, or PAN card is sent to the card scheme 112 or issuer (or BIN controller)114 to request the PAR corresponding to the PAN or PAN token or PAN equivalent or PAN derivative (Step 302). The corresponding PAR is then received in response to the request (Step 304). The PAR can then be stored (Step 306). This type of PAN to PAR swap can be performed by any entities (merchant 102, user 104, etc.) In the example of the sales receipt system 108 performing the swap, for example, the communication between the sales receipt system 108 and the card scheme is indicated by arrows 166 and 168 in FIG. 1. The communication with the issuer 114 is indicated by arrows 170 and 172 in FIG. 1.

The registration (step 202) set forth in FIG. 2 of registering the user need only happen once, while each of the user's PAN(s) or PAN token(s) or PAN equivalent(s) or PAN derivative(s) may only have to be registered once, after which any number of transactions can be processed and electronic sales receipts can be issued by the system using the user account data as set forth in the rest of the method 200 starting at Step 204. However, the user account can be updated in a similar manner to include changes to the user data.

Any given customer purchase transaction begins with the merchant 102 receiving payment data from a payment instrument 119 having payment instrument information for the customer purchase transaction via a POS system, such as a terminal/payment device reader, or payment gateway as indicated by arrow 130 in FIG. 1 (Step 204). The information for the payment instrument 119 can be provided electronically or physically, such as by providing a PAN card such as a credit or debit card, for reading by a device at the merchant 102.

The merchant 102 then communicates payment instrument information to the payment processor 106 computing system as indicated by arrow 134 in FIG. 1 (step 206). The payment processor 106 then processes the payment (Step 208). In certain embodiments, processing payment involves providing payment instrument information to, and receiving payment data for, the purchase transaction in response from one or more of: an acquirer, a card scheme, and an issuer. This transfer of data can happen through direct or indirect communication. For example, in FIG. 1 the payment processor 106 may provide payment instrument information to the acquirer 110 as indicated by arrow 150. In response, the acquirer 110 provides payment data as indicated by arrow 152. The acquirer 110 in turn can acquire the payment information from a card scheme 112 by providing the payment instrument information to the card scheme 112 as indicated by arrow 154, and receiving the payment data in response as indicated by arrow 156. Similarly, the card scheme 112 can acquire the payment data from the card issuer (or BIN controller) 114 by providing the payment instrument information to the card issue 112 as indicated by arrow 158 and receiving the payment data in response as indicated by arrow 160. It should be understood that such an interaction to acquire the payment data can happen between any of the entities 102, 106, 110, 112, 114. For example, in the case when the payment processor 106 and the acquirer 110 are the same entity, the payment processor 106 may communicate with the card scheme 112 and/or issuer 114 to obtain the payment data.

The payment data is stored in the payment processor datastore 120 (Step 210). In some embodiments, the payment data includes the customer PAR. In some such embodiments, the customer PAR is provided to the payment processor 106 along with the payment instrument 119. In other embodiments, the customer PAR is obtained by the payment processor computing system as part of payment processing. For example, the customer PAR can be provided to the payment processor 106 by the acquirer 110, card scheme 112, or issuer (or BIN controller)114.

The payment processor 106 then confirms the processing of the payment with the merchant 102 (Step 212). In certain embodiments, confirming the processing of the payment may also include providing a payment authorization message sent to the sales receipt system 108. In some embodiments, the payment data may also be provided to the merchant 102 as part of payment confirmation. In some instances, this data contains the PAR. The payment data may be stored in the datastore 117 of the merchant 102.

The merchant 102 then completes the purchase transaction (Step 214). In certain embodiments, this includes printing a physical sales receipt for the user 104 as indicated by arrow 132 in FIG. 1. The sales receipt data is then stored in the merchant datastore 118 (Step 216). In certain embodiments, this data may also include the PAR.

Figure 4:
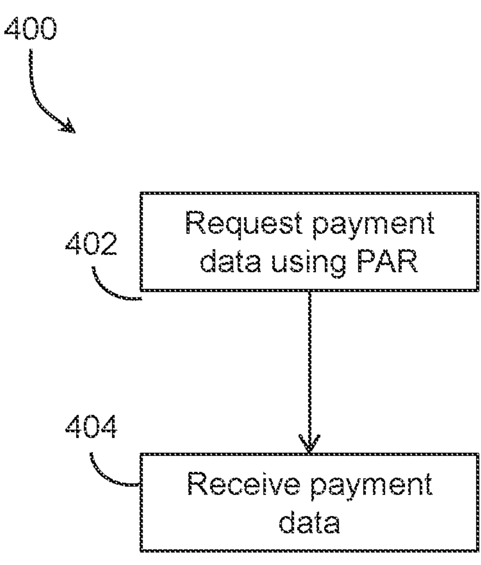
FIG. 4 is a flow diagram depicting an example methodology of requesting payment data.

The sales receipt system 108 then receives the payment data, or part of the payment data, (Step 218). As indicated previously, the user is identified by a customer PAR stored in the datastore 122 of the sales receipt system 108. Using this PAR, the sales receipt system 108 can identify which payment data is associated with the user. The payment data can be received from the payment processor 106, acquirer 110, card scheme 112, issuer (or BIN controller) 114, or even the merchant 102. As discussed previously in regard to payment processing (Step 208), any one or multiple of these entities is capable of providing the payment data. The payment data may be provided with or without being requested. For example, in some embodiments, the payment data is provided to the sales receipt system 108 by merchant 102, payment processor 106, acquirer 110, card scheme 112, or issuer (or BIN controller) 114 when payment is confirmed. In other embodiments, the payment data is provided in response to a request from the sales receipt system 108. In some embodiments, this request is made using the customer PAR. FIG. 4 provides an example method 400 the sales receipt system 108 performs to request the payment data from the payment processor 106, acquirer 110, card scheme 112, issuer (or BIN controller) 114 or merchant 102 while FIG. 5 provides an example method 500 performed by the payment processor 106, acquirer 110, card scheme 112, issuer (or BIN controller) 114, or merchant 102 in responding to the request from the sales receipt system 108.

In some such embodiments, as set forth in FIG. 4, the sales receipt system 108 can make a request to one or more of the merchant 102, payment processor 106, acquirer 110, card scheme 112, or issuer (or BIN controller) 114 for payment data using the customer PAR stored in the datastore 122 (Step 402) and receives, in response, the payment data including the customer provided customer PAR that is stored in the respective datastores 116, 120, 124, 126, 128 of the merchant 102, payment processor 106, acquirer 110, card scheme 112, or issuer 114 to whom the request was made. (Step 404).

Figure 5:
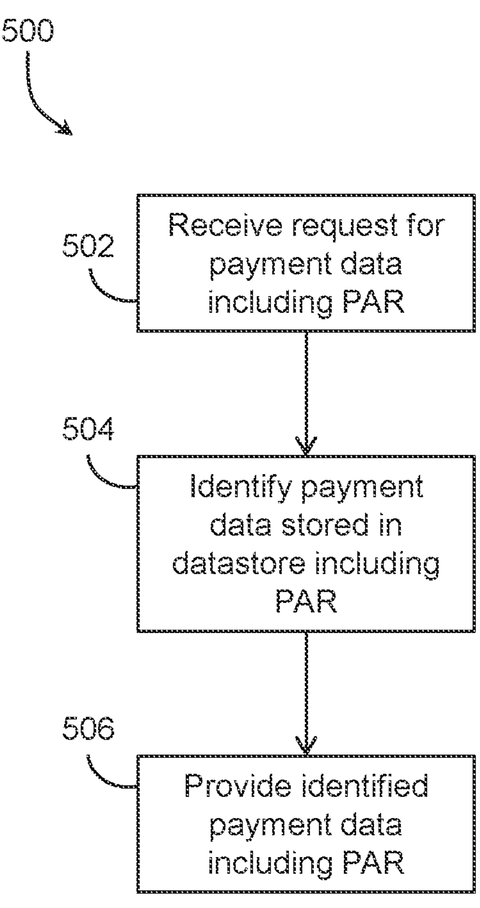
FIG. 5 is a flow diagram depicting an example methodology of receiving a request for payment data.

In the embodiment as set forth in FIG. 5, the merchant 102, payment processor 106, acquirer 110, card scheme 112, or issuer (or BIN controller) 114 to whom a request for payment data is directed receives the request for payment data including the provided customer PAR (Step 502). Payment data including the provided customer PAR is identified in the respective datastore 117, 120, 124, 126, and 128 (Step 504). The identified payment data including the customer PAR is provided to the requester, in this case, the sales receipt system 108 (Step 506).

It should be noted, however, that the payment data may also be provided without a request being made. In certain embodiments, the respective datastore 117, 120, 124, 126, and 128 can be configured to automatically provide the payment data to the sales receipt system 108. It should also be understood that a request can be made without using PAR. In such embodiments, the request and response are similar to the process for requesting and receiving sales receipt data as set forth below in reference to FIG. 6 and FIG. 7 below where other transaction parameters can be used to identify a transaction including, but not limited to merchant/POS of transaction, transaction ID, merchant/POS ID, merchant code, authorization code, last 4 PAN digits, First 6 PAN digits, PAN Token/derivative, Terminal ID, currency code, amount of transaction, date of transaction, and time of transaction.

The communication with the merchant 102 is indicated by arrows 138 and 140 in FIG. 1. The communication with the payment processor 106 is indicated by arrows 142 and 144 in FIG. 1. The communication with the acquirer 110 is indicated by arrows 162 and 164 in FIG. 1. The communication with the card scheme 112 is indicated by arrows 166 and 168 in FIG. 1. The communication with the issuer (or BIN controller) 114 is indicated by arrows 170 and 172 in FIG. 1. In certain embodiments, this communication is performed by an API call, webhook, or similar means of communication between systems/computer devices/databases. It should also be understood that the methodology of FIG. 4 and FIG. 5 can also be used for requests for payment data between any of the payment processor 106, acquirer 110, card scheme 112, or issuer (or BIN controller) 114.

Referring back to FIG. 2. In addition to receiving the payment data (Step 218), the sales receipt system 108 receives sales receipt data (Step 220). While the sales receipt data is typically generated and stored at the merchant 102 (Step 216), the sales receipt data can also be received from the payment processor 106, acquirer 110, card scheme 112, or issuer (or BIN controller) 114. In certain embodiments, the payment processor 106, acquirer 110, card scheme 112, or issuer (or BIN controller) 114 may have access to the sales receipt data through direct, or indirect communication, with the merchant 102. Such communication is indicated by arrows 134, 136, 150, 152, 154, 156, 158, 160, 172, 174, 176, 178, 180, and 182.

Figure 6:
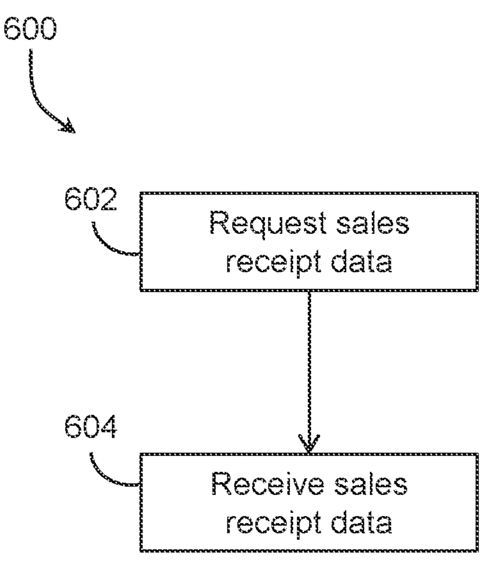
FIG. 6 is a flow diagram depicting an example methodology for requesting receipt data.

The sales receipt data may be provided with or without being requested. For example, in some embodiments, the sales receipt data is provided to the sales receipt system 108 by merchant 102, payment processor 106, acquirer 110, card scheme 112, or issuer (or BIN controller) 114 when the payment transaction is completed. In other embodiments, the sales receipt data is provided in response to a request from the sales receipt system 108. FIG. 6 provides an example method 600 the sales receipt system 108 performs to request the sales receipt data from the merchant 102, payment processor 106, acquirer 110, card scheme 112, or issuer 114 (or BIN controller) while FIG. 7 provides an example method 700 performed by the merchant 102, payment processor 106, acquirer 110, card scheme 112, or issuer 114 (or BIN controller) in responding to the request from the sales receipt system 108.

As set forth in FIG. 6, the sales receipt system 108 makes a request to one or more of the merchant 102, payment processor 106, acquirer 110, card scheme 112, or issuer (or BIN controller) 114 for sales receipt data (Step 602) and receives, in response, sales receipt data matching the request that is stored in the respective datastores 118, 120, 124, 126, 128 of the merchant 102, payment processor 106, acquirer 110, card scheme 112, or issuer 114 (or BIN controller) to whom the request was made (Step 604). However, unlike the payment data, the sales receipt data stored in the respective datastore 118, 120, 124, 126, 128 may not include a customer PAR. In cases where the customer PAR is not included in the sales receipt data, the sales receipt system extracts transaction parameters from the payment data received and includes those transaction parameters in the request. The transaction parameters can include, but is not limited to, one or more of: merchant/POS of transaction, transaction ID, merchant/POS ID, merchant code, authorization code, last 4 PAN digits, First 6 PAN digits, PAN Token/derivative, Terminal ID, currency code, amount of transaction, date of transaction, and time of transaction. In cases where the sales receipt data includes the customer PAR, the customer PAR can be included in the request.

Figure 7:
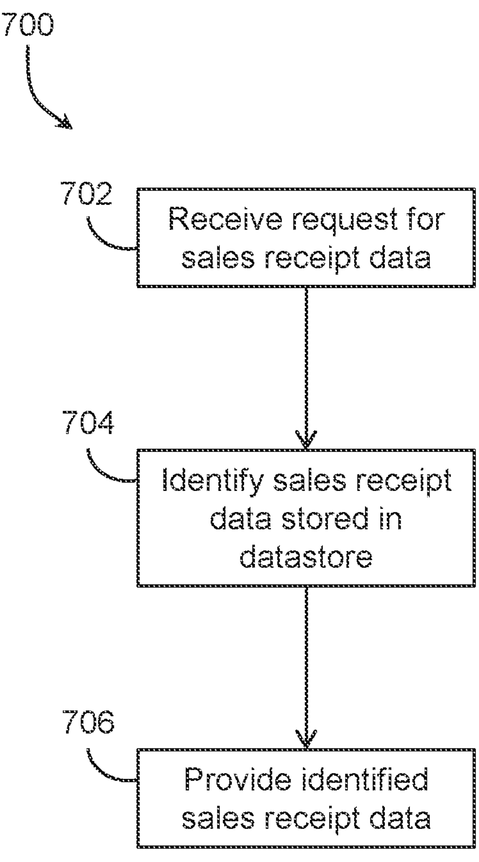
FIG. 7 is a flow diagram depicting an example methodology of receiving a request for receipt data.

As set forth in FIG. 7, the merchant 102, payment processor 106, acquirer 110, card scheme 112, or issuer (or BIN controller) 114 to whom a request for sales receipt data is directed receives the request for sales receipt data including the identifying information such as transaction parameters extracted from the payment data or the customer PAR (Step 702). Sales receipt data including the provided transaction parameters or customer PAR is identified in the respective datastore 118, 120, 124, 126, and 128 (Step 704). The identified sales receipt data including the provided transaction parameters or customer PAR is provided to the requester, in this case, the sales receipt system 108 (Step 706).

The communication with the merchant 102 is indicated by arrows 138 and 140 in FIG. 1. The communication with the payment processor 106 is indicated by arrows 142 and 144 in FIG. 1. The communication with the acquirer 110 is indicated by arrows 162 and 164 in FIG. 1. The communication with the card scheme 112 is indicated by arrows 166 and 168 in FIG. 1. The communication with the issuer (or BIN controller) 114 is indicated by arrows 170 and 172 in FIG. 1. The communication between the payment processor 106 and the merchant 102 is indicated by arrows 134 and 136. The communication between the Acquirer 110 and the merchant 102 is indicated by arrows 172 and 174. The communication between the card scheme 112 and the merchant 102 is indicated by arrows 176 and 178. The communication between the issuer (or BIN controller) 114 and the merchant 102 is indicated by arrows 180 and 182. In certain embodiments, this communication is performed by an API call, webhook, or similar means of communicating between system, computer devices, or databases.

It should also be understood that the methodology of FIG. 6 and FIG. 7 can also be used for requests for sales receipt data between any of the payment processor 106, acquirer 110, card scheme 112, or issuer (or BIN controller) 114. Similarly, the methodology of FIG. 6 and FIG. 7 can be used to request payment data from any of the merchant 102 payment processor 106, acquirer 110, card scheme 112, or issuer (or BIN controller) 114 when a PAR in not available to make a request.

Referring back to FIG. 2, having received the payment data (Step 218) and the sales receipt data (Step 220), the sales receipt system 108 then matches the payment data and the sales receipt data with a user identified by a customer PAR stored in the datastore 122 (Step 222). In some embodiments, where the sales receipt system 108 receives the sales receipt data and payment data from different entities, the sales receipt system 108 may need to match or otherwise link the separately received sales receipt data and payment data together with the user data using the PAR. In one embodiment, where the sales receipt system 108 receives the sales receipt data and payment data from the same entity, the sales receipt data and payment data may already be matched or otherwise linked and only require matching or linking with the user using the PAR. An electronic sales receipt can then be issued to the identified user by the sales receipt system 108 or another entity such as the merchant 102, payment processor 106, acquirer 110, card scheme 112, or card issuer (or BIN controller) 114 (Step 224). The issuance of the electronic sales receipt is facilitated by the sales receipt system 108 providing the matched or otherwise linked payment data, the sales receipt data, and user data identified by a customer PAR to the entity issuing the electronic sales receipt. In certain embodiments, issuing the electronic receipt involves providing an electronic communication to the computing device of the user 104. In other embodiments, an electronic sales receipt is provided using the web interface or application the user 104 uses to register an account on the sales receipt system 108 (Step 202), or an account in the merchants 102 own system/systems, or an account with a service provider/partner/customer (such as banks, issuers, expense management systems, or other receipt providers) of the sales receipt system 108, or a combination thereof. In some such embodiments, the electronic sales receipts (or any other stored data) can be used as part of an archival, bookkeeping, or accounting system and can be accessed or otherwise provided using the customer PAR associated with the user 104.

Figure 8:
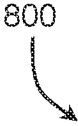
FIG. 8 is a block diagram of an example computing device used to implement an electronic sales receipt system.
Figure 8:
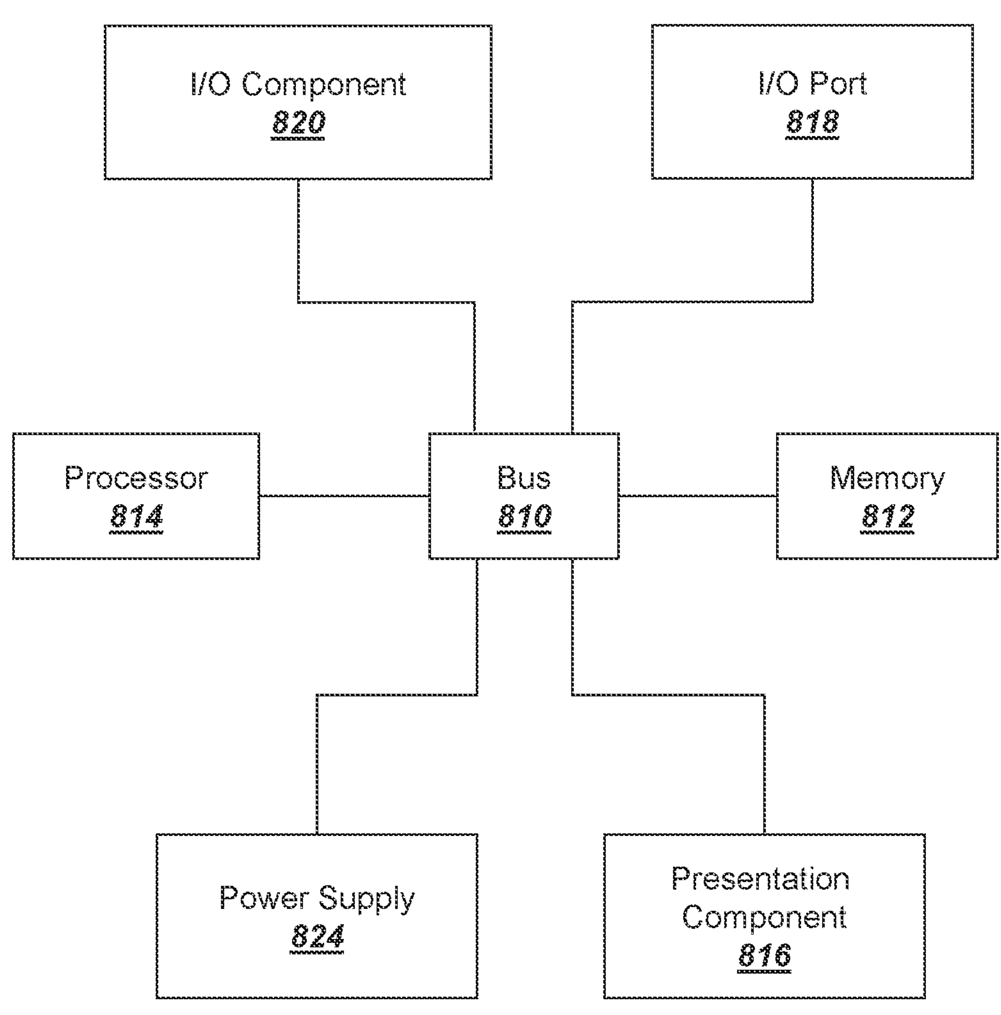

Any suitable and specifically configured electronic or computing device can be used to implement the functionality of the merchant 102 (including POS system 115, payment terminal/payment device reader 116, and/or payment gateway 117), user 104, payment processor 106, sales receipt system 108, acquirer 110, card scheme 112, or card issuer (or BIN controller) 114 described herein. One illustrative example of such an electronic or computing device 800 is depicted in FIG. 8. The computing device 800 is merely an illustrative example of a suitable computing environment and in no way limits the scope of the present invention. A "computing device," as represented by FIG. 8, can include a "workstation," a "server," a "laptop," a "desktop," a "device", a "smart device", a "tablet", a "smartphone", an "ECR" or other specifically configured computing devices, as would be understood by those of skill in the art. Given that the computing device 800 is depicted for illustrative purposes, embodiments of the present invention may utilize any number of computing devices 800 in any number of different ways to implement a single embodiment of the present invention. Accordingly, embodiments of the present invention are not limited to a single computing device 800, as would be appreciated by one with skill in the art, nor are they limited to a single type of implementation or configuration of the example computing device 800.

The computing device 800 can include a bus or network 810 that can be coupled to one or more of the following illustrative components, directly or indirectly: a memory 812, one or more processors 814, one or more presentation components 816, input/output ports 818, input/output components 820, and a power supply 824.

One of skill in the art will appreciate that the bus 810 can include one or more busses, such as an address bus, a data bus, networks, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device that can be used to implement one or more embodiments of the present invention, and in no way limits the invention.

The computing device 800 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD), Solid State Drive (SSD), cloud, or other optical or holographic media; magnetic cassettes, magnetic tape, magnetic disk storage or other magnetic storage devices that can be used to encode information and can be accessed by the computing device 800.

The memory 812 can include computer-storage media in the form of volatile and/or nonvolatile memory. The memory 812 may be removable, non-removable, or any combination thereof. Exemplary hardware devices are devices such as hard drives, solid-state memory, optical-disc drives, and the like. The computing device 800 can include one or more processors that read data from components such as the memory 812, the various I/O components 820, etc. Presentation component(s) 816 present data indications to a user or other device. Exemplary presentation components include a display device, speaker, printing component, vibrating component, etc.

The I/O ports 818 can enable the computing device 800 to be logically coupled to other devices, such as I/O components 820 using serial, parallel, or network, and/or wireless communication protocols. Some of the I/O components 820 can be built into the computing device 800. Examples of such I/O components 820 include a microphone, joystick, recording device, gamepad, satellite dish, scanner, printer, wireless device, networking device, and the like.

The functionality of the present invention depicted in FIGS. 2-7 is provided by the system and hardware of FIG. 1 and FIG. 8 through the execution of software that transforms the hardware into specifically configured hardware suitable for implementing the technological advancements of the present invention. It should be understood that the functionality of any component can be combined with or otherwise provided by any other component of the system so long as desired operability and performance are maintained. For example, in some embodiments, the merchant 102 (or, in some cases, the POS system 115 and/or payment gateway 116 of the merchant 102) could perform the matching of the payment data to the receipt data and generate or otherwise issue the electronic receipt. This electronic receipt would only identify the user 104 by the customer PAR. In some versions of this embodiment, receipt system 108 would receive and store the electronic receipt for archiving, bookkeeping, and distribution to, or future access by the user 104. It should further be noted that the present inventive system and method does not preclude operation with other third-party systems where any of the other components could also perform the matching, or any other functionality described herein. Some such integrations with other third-party systems may or may not include all of the inventive aspects of the present invention, but that does not necessarily preclude such integrations.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

As used herein, an "electronic sales receipt" is a non-physical sales receipt whether it being referred to as a "computerized", "electronic", "digital", "non-paper", or "programmed" sales receipt. Further, it should also be noted, that there is a notable difference between a "sales receipt" and "card receipt", as sales receipt is the most detailed form of receipt (including but not limited to line item) one can get, and thus has multiple purposes, whereas a simple "card receipt" doesn't have the same purpose.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween. It is also to be understood that the following claims are to cover all generic and specific features of the invention described herein, and all statements of the scope of the invention which, as a matter of language, might be said to fall therebetween.

What is claimed is:

1. A method of matching transaction data and sales receipt data to a user for a customer purchase transaction, the method comprising:

a merchant computing system receiving payment instrument information via a payment instrument provided to complete payment for the customer purchase transaction comprising at least one of: a Primary Account Number (PAN), a token corresponding to the PAN, or PAN derivatives;

the merchant computing system communicating the payment instrument information to a payment processor computing system;

the payment processor computing system:

processing payment;

storing payment data for the purchase transaction comprising a total billable amount without a line-item breakdown in a payment processor datastore including reference to a customer Payment Account Reference (PAR), wherein the PAR identifies the user and not the payment instrument; and confirming processing of the payment with the merchant computing system;

the merchant computing system:

completing the purchase transaction; and storing sales receipt data comprising line-item level data in a merchant datastore;

a sales receipt computing system, on which the customer PAR associated with the user is stored, receiving the payment data generated by the payment processor computing system, wherein the user is identified by the customer PAR and not by the payment instrument;

the sales receipt computing system receiving the sales receipt data generated by the merchant computing system; and the sales receipt computing system matching the payment data and the sales receipt data with the user using the customer PAR identifying the user and without requiring the payment instrument or payment instrument information comprising a PAN or a token corresponding to the PAN or PAN derivatives, wherein the matching enables issuance of an electronic sales receipt to the user.

2. The method of claim 1, wherein the customer PAR is provided with the payment instrument.

3. The method of claim 1, wherein the customer PAR is provided to the payment processor computing system as part of payment processing.

4. The method of claim 3, wherein the customer PAR is provided to the payment processor computing system by an acquirer, card scheme, or issuer computing system.

5. The method of claim 1, further comprising:

the sales receipt computing system:

receiving a primary account number (PAN) or PAN token or PAN equivalent;

sending the PAN or PAN token or PAN equivalent to an issuer or card scheme to request the PAR corresponding to the PAN or PAN token or PAN equivalent;

receiving the customer PAR in response to the request; and storing the customer PAR.

6. The method of claim 1, wherein processing payment comprises providing payment instrument information to and receiving payment data for the purchase transaction in response from one or more of: an acquirer, a card scheme, and an issuer.

7. The method of claim 1, wherein the payment processing confirmation comprises a payment authorization message sent to one or more of: the merchant computing system, an acquiring computing system, a card scheme computing system, card issuing computing system, and the sales receipt computing system.

8. The method of claim 1, wherein payment data received by the sales receipt computing system is provided by the payment processor computing system.

9. The method of claim 8, wherein the payment processor computing system provides the sales receipt computing system the payment data when payment processing is confirmed.

10. The method of claim 8, wherein receiving the payment data comprises the sales receipt computing system:

requesting payment data from the payment processor computing system using the customer PAR; and receiving, in response to the request, the payment data stored in the payment processor datastore including reference to the customer PAR.

11. The method of claim 10, wherein receiving the payment data from the payment processor computing system further comprises the payment processor computing system:

receiving the request for payment data from the sales receipt computing system;

identifying the payment data stored in the payment processor datastore including reference to the customer PAR; and providing the sales receipt computing system with the identified payment data stored in the payment processor datastore including reference to the customer PAR.

12. The method of claim 1, wherein payment data received by the sales receipt computing system is provided by an acquirer computing system involved in the processing of the payment.

13. The method of claim 12, wherein the acquirer computing system provides the sales receipt computing system the payment data when payment processing is confirmed.

14. The method of claim 12, wherein receiving the payment data comprises the sales receipt computing system:

requesting payment data from the acquirer computing system using the customer PAR; and receiving, in response to the request, the payment data stored in an acquirer datastore including reference to the customer PAR.

15. The method of claim 14, wherein receiving the payment data from the acquirer computing system further comprises the acquirer computing system:

receiving the request for payment data from the sales receipt computing system;

identifying the payment data stored in the acquirer datastore including reference to the customer PAR; and providing the sales receipt computing system with the identified payment data stored in the acquirer datastore including reference to the customer PAR.

16. The method of claim 1, wherein payment data received by the sales receipt computing system is provided by a card scheme computing system involved in the processing of the payment.

17. The method of claim 16, wherein the card scheme computing system provides the sales receipt computing system the payment data when payment processing is confirmed.

18. The method of claim 16, wherein receiving the payment data comprises the sales receipt computing system:

requesting payment data from the card scheme computing system using the customer PAR; and receiving, in response to the request, the payment data stored in a card scheme datastore including reference to the customer PAR.

19. The method of claim 18, wherein receiving the payment data from the card scheme computing system further comprises the card scheme computing system:

receiving the request for payment data from the sales receipt computing system;

identifying the payment data stored in the card scheme datastore including reference to the customer PAR; and providing the sales receipt computing system with the identified payment data stored in the card scheme datastore including reference to the customer PAR.

20. The method of claim 1, wherein payment data received by the sales receipt computing system is provided by an issuer computing system involved in the processing of the payment.

21. The method of claim 20, wherein the issuer computing system provides the sales receipt computing system the payment data when payment processing is confirmed.

22. The method of claim 20, wherein receiving the payment data comprises the sales receipt computing system:

requesting payment data from the issuer computing system using the customer PAR; and receiving, in response to the request, the payment data stored in an issuer datastore including reference to the customer PAR.

23. The method of claim 22, wherein receiving the payment data from the issuer computing system further comprises the issuer computing system:

receiving the request for payment data from the sales receipt computing system;

identifying the payment data stored in the issuer datastore including reference to the customer PAR; and providing the sales receipt computing system with the identified payment data stored in an issuer datastore including reference to the customer PAR.

24. The method of claim 1, wherein payment data received by the sales receipt computing system is provided by the merchant computing system.

25. The method of claim 24, wherein the merchant computing system provides the sales receipt computing system the payment data when the purchase transaction is complete.

26. The method of claim 24, wherein receiving the payment data comprises the sales receipt computing system:

requesting payment data from the merchant computing system using the customer PAR; and receiving, in response to the request, the payment data stored in the merchant datastore including reference to the customer PAR.

27. The method of claim 26, wherein receiving the payment data from the merchant computing system further comprises the merchant computing system:

receiving the request for payment data from the sales receipt computing system;

identifying the payment data stored in the merchant datastore including reference to the customer PAR; and providing the sales receipt computing system with the identified payment data stored in a merchant datastore including reference to the customer PAR.

28. The method of claim 1, wherein the sales receipt data received by the sales receipt computing system is provided by the merchant computing system.

29. The method of claim 28, wherein the merchant computing system provides the sales receipt computing system the sales receipt data when the purchase transaction is complete.

30. The method of claim 28, wherein receiving the sales receipt data from the merchant computing system comprises the sales receipt computing system:

extracting transaction parameters from the payment data received;

requesting the sales receipt data from the merchant computing system using the extracted transaction parameters; and receiving, in response to the request, the sales receipt data stored in the merchant datastore.

31. The method of claim 30, wherein the transaction parameters comprise one or more of:

merchant/POS of transaction, transaction ID, merchant/POS ID, merchant code, authorization code, last 4 PAN digits, First 6 PAN digits, PAR, PAN Token/derivative, Terminal ID, currency code, amount of transaction, date of transaction, and time of transaction.

32. The method of claim 30, wherein receiving the sales receipt data from the merchant computing system further comprises the merchant computing system:

receiving the request for the sales receipt data from the sales receipt computing system;

identifying the sales receipt data stored in the merchant datastore including the transaction data; and providing the sales receipt computing system with the identified sales receipt data stored in the merchant datastore.

33. The method of claim 28, wherein the sales receipt data stored in the merchant datastore includes the customer PAR.

34. The method of claim 33, wherein receiving the sales receipt data from the merchant computing system comprises the sales receipt computing system:

requesting the sales receipt data from the merchant computing system using the customer PAR; and receiving, in response to the request, the sales receipt data stored in the merchant datastore including reference to the customer PAR.

35. The method of claim 34, wherein receiving the sales receipt data from the merchant computing system further comprises the merchant computing system:

receiving the request for the sales receipt data from the sales receipt computing system;

identifying the sales receipt data stored in the merchant datastore including reference to the customer PAR; and providing the sales receipt computing system with the identified sales receipt data stored in the merchant datastore including reference to the customer PAR.

36. The method of claim 1, wherein the sales receipt data received by the sales receipt computing system is provided by the payment processor computing system.

37. The method of claim 36, wherein the payment processor computing system provides the sales receipt computing system the sales receipt data when the purchase transaction is complete.

38. The method of claim 36, wherein receiving the sales receipt data from the payment processor computing system comprises the sales receipt computing system:

extracting transaction parameters from the payment data received;

requesting the sales receipt data from the payment processor computing system using the extracted transaction parameters; and receiving, in response to the request, the sales receipt data stored in the payment processor datastore.

39. The method of claim 38, wherein the transaction parameters comprise one or more of:

merchant/POS of transaction, transaction ID, merchant/POS ID, merchant code, authorization code, last 4 PAN digits, First 6 PAN digits, PAR, PAN Token/derivative, Terminal ID, currency code, amount of transaction, date of transaction, and time of transaction.

40. The method of claim 38, wherein receiving the sales receipt data from the payment processor computing system further comprises the payment processor computing system:

receiving the request for the sales receipt data from the sales receipt computing system;

identifying the sales receipt data stored in the payment processor datastore including the transaction data; and providing the sales receipt computing system with the identified sales receipt data stored in the payment processor datastore.

41. The method of claim 36, wherein the sales receipt data stored in the payment processor datastore includes the customer PAR.

42. The method of claim 41, wherein receiving the sales receipt data from the payment processor computing system comprises the sales receipt computing system:

requesting the sales receipt data from the payment processor computing system using the customer PAR; and receiving, in response to the request, the sales receipt data stored in the payment processor datastore including reference to the customer PAR.

43. The method of claim 42, wherein receiving the sales receipt data from the payment processor computing system further comprises the payment processor computing system:

receiving the request for the sales receipt data from the sales receipt computing system;

identifying the sales receipt data stored in the payment processor datastore including reference to the customer PAR; and providing the sales receipt computing system with the identified sales receipt data stored in the payment processor datastore including reference to the customer PAR.

44. The method of claim 1, wherein the sales receipt data received by the sales receipt computing system is provided by an acquirer computing system involved in the processing of payment.

45. The method of claim 44, wherein the acquirer computing system provides the sales receipt computing system the sales receipt data when the purchase transaction is complete.

46. The method of claim 44, wherein receiving the sales receipt data from the acquirer computing system comprises the sales receipt computing system:

extracting transaction parameters from the payment data received;

requesting the sales receipt data from the acquirer computing system using the extracted transaction parameters; and receiving, in response to the request, the sales receipt data stored in an acquirer datastore.

47. The method of claim 46, wherein the transaction parameters comprise one or more of:

merchant of transaction, transaction ID, merchant ID, merchant code, authorization code, last 4 PAN digits, First 6 PAN digits, PAR, PAN Token/derivative, Terminal ID, currency code, amount of transaction, date of transaction, and time of transaction.

48. The method of claim 46, wherein receiving the sales receipt data from the acquirer computing system further comprises the acquirer computing system:

receiving a request for the sales receipt data from the sales receipt computing system;

identifying the sales receipt data stored in an acquirer datastore including the transaction data; and providing the sales receipt computing system with the identified sales receipt data stored in an acquirer datastore.

49. The method of claim 44, wherein the sales receipt data stored at the acquirer computing system includes the customer PAR.

50. The method of claim 49, wherein receiving the sales receipt data from the acquirer computing system comprises the sales receipt computing system:

requesting the sales receipt data from the acquirer computing system using the customer PAR; and receiving, in response to the request, the sales receipt data stored in an acquirer datastore including reference to the customer PAR.

51. The method of claim 50, wherein receiving the sales receipt data from the acquirer computing system further comprises the acquirer computing system:

receiving a request for the sales receipt data from the sales receipt computing system;

identifying the sales receipt data stored in an acquirer datastore including reference to the customer PAR; and providing the sales receipt computing system with the identified sales receipt data stored in an acquirer datastore including reference to the customer PAR.

52. The method of claim 1, wherein the sales receipt data received by the sales receipt computing system is provided by a card scheme computing system involved in the processing of payment.

53. The method of claim 52, wherein the card scheme computing system provides the sales receipt computing system the sales receipt data when the purchase transaction is complete.

54. The method of claim 52, wherein receiving the sales receipt data from the card scheme computing system comprises the sales receipt computing system:

extracting transaction parameters from the payment data received;

requesting the sales receipt data from the card scheme computing system using the extracted transaction parameters; and receiving, in response to the request, the sales receipt data stored in a card scheme datastore.

55. The method of claim 54, wherein the transaction parameters comprise one or more of:

merchant/POS of transaction, transaction ID, merchant/POS ID, merchant code, authorization code, last 4 PAN digits, First 6 PAN digits, PAR, PAN Token/derivative, Terminal ID, currency code, amount of transaction, date of transaction, and time of transaction.

56. The method of claim 54, wherein receiving the sales receipt data from the card scheme computing system further comprises the card scheme computing system:

receiving a request for the sales receipt data from the sales receipt computing system;

identifying the sales receipt data stored in a card scheme datastore including the transaction data; and providing the sales receipt computing system with the identified sales receipt data stored in the card scheme datastore.

57. The method of claim 52, wherein the sales receipt data stored at the card scheme computing system includes the customer PAR.

58. The method of claim 57, wherein receiving the sales receipt data from the card scheme computing system comprises the sales receipt computing system:

requesting the sales receipt data from the card scheme computing system using the customer PAR; and receiving, in response to the request, the sales receipt data stored in a card scheme datastore including reference to the customer PAR.

59. The method of claim 58, wherein receiving the sales receipt data from the card scheme computing system further comprises the card scheme computing system:

receiving a request for the sales receipt data from the sales receipt computing system;

identifying the sales receipt data stored in a card scheme datastore including reference to the customer PAR; and providing the sales receipt computing system with the identified sales receipt data stored in the card scheme datastore including reference to the customer PAR.

60. The method of claim 1, wherein the sales receipt data received by the sales receipt computing system is provided by an issuer computing system involved in the processing of payment.

61. The method of claim 60, wherein the issuer computing system provides the sales receipt computing system the sales receipt data when the purchase transaction is complete.

62. The method of claim 60, wherein receiving the sales receipt data from the issuer computing system comprises the sales receipt computing system:

extracting transaction parameters from the payment data received;

requesting the sales receipt data from the issuer computing system using the extracted transaction parameters; and receiving, in response to the request, the sales receipt data stored in an issuer datastore.

63. The method of claim 62, wherein the transaction parameters comprise one or more of:

merchant/POS of transaction, transaction ID, merchant/POS ID, merchant code, authorization code, last 4 PAN digits, First 6 PAN digits, PAR, PAN Token/derivative, Terminal ID, currency code, amount of transaction, date of transaction, and time of transaction.

64. The method of claim 62, wherein receiving the sales receipt data from the issuer computing system further comprises the issuer computing system:

receiving a request for the sales receipt data from the sales receipt computing system;

identifying the sales receipt data stored in an issuer datastore including the transaction data; and providing the sales receipt computing system with the identified sales receipt data stored in the issuer datastore.

65. The method of claim 60, wherein the sales receipt data stored at the issuer computing system includes the customer PAR.

66. The method of claim 65, wherein receiving the sales receipt data from the issuer computing system comprises the sales receipt computing system:

requesting the sales receipt data from the issuer computing system using the customer PAR; and receiving, in response to the request, the sales receipt data stored in an issuer datastore including reference to the customer PAR.

67. The method of claim 66, wherein receiving the sales receipt data from the issuer computing system further comprises the issuer computing system:

receiving a request for the sales receipt data from the sales receipt computing system;

identifying the sales receipt data stored in an issuer datastore including reference to the customer PAR; and providing the sales receipt computing system with the identified sales receipt data stored in the issuer datastore including reference to the customer PAR.

68. The method of claim 1, further comprising storing one or more of the payment data, receipt data, and the electronic sales receipt wherein the user is identified by the PAR in a datastore of the sales receipt computing system.

69. The method of claim 1, wherein the merchant computing system comprises a Point of Sale (POS) system.

70. The method of claim 1, wherein the merchant computing system comprises a payment gateway.

71. The method of claim 1, wherein the merchant computing system comprises a payment terminal or payment device reader.

72. The method of claim 1, further comprising:

the sales receipt computing system issuing an electronic sales receipt to the user.

73. The method of claim 1, further comprising:

providing the payment data and sales receipt data matched with the user to one or more of: merchant, payment processor, acquirer, card scheme, and issuer so that an electronic sales receipt can be issued to the user.

74. The method of claim 1, wherein the sales receipt computing system receives the PAR from one or more of: user, merchant, payment processor, acquirer, card scheme, and issuer.

* * * * *